United States Patent [19]
Birdwell

[11] Patent Number: 5,447,544
[45] Date of Patent: Sep. 5, 1995

[54] AIR FILTERING APPARATUS

[75] Inventor: Gaylon W. Birdwell, Houston, Tex.

[73] Assignee: Air Engineers, Inc., Houston, Tex.

[21] Appl. No.: 153,761

[22] Filed: Nov. 17, 1993

[51] Int. Cl.[6] ............................................. B01D 46/00
[52] U.S. Cl. ........................................ 55/274; 55/472; 55/480; 55/493; 55/494; 55/502; 55/508
[58] Field of Search ...................... 55/385.2, 471, 472, 55/481, 483, 485, 493, 497, 501, 502, 504, 511, 480, 494, 508, 274; 96/134, 136, 138

[56] References Cited

U.S. PATENT DOCUMENTS

| | | | |
|---|---|---|---|
| 2,853,153 | 9/1958 | Sexton | 55/481 X |
| 3,393,498 | 7/1968 | Schoen | 55/493 |
| 3,507,100 | 4/1970 | Neumann | 55/481 |
| 3,593,503 | 7/1971 | Andrews | 55/481 |
| 3,630,008 | 12/1971 | Revell et al. | 55/493 |
| 3,816,984 | 6/1974 | Neumann | 55/481 |
| 4,002,443 | 1/1977 | Lorenz | 55/493 |
| 4,140,047 | 2/1979 | Bowman et al. | 55/480 |
| 4,198,221 | 4/1980 | Catlin et al. | 55/481 |
| 4,217,122 | 8/1980 | Shuler | 55/493 |
| 4,266,956 | 5/1981 | Revell | 55/493 |
| 4,472,184 | 9/1984 | Neumann et al. | 55/481 |
| 4,486,204 | 12/1984 | Marijnissen et al. | 55/493 |
| 4,521,234 | 6/1985 | Pebbles, Jr. et al. | 55/481 |
| 4,548,627 | 10/1985 | Landy | 55/472 X |
| 4,632,681 | 12/1986 | Brunner | 55/493 |
| 4,978,375 | 12/1990 | Il Yoo | 55/493 |

FOREIGN PATENT DOCUMENTS

| | | | |
|---|---|---|---|
| 622926 | 6/1927 | France | 55/481 |
| 1543310 | 4/1979 | United Kingdom | 55/493 |

Primary Examiner—Charles S. Bushey
Attorney, Agent, or Firm—Ben D. Tobor

[57] ABSTRACT

An air filtering apparatus and filter mounting device for sealing a filter within an air filtering apparatus, utilizes at least one cam surface to force a filter to compress a gasket to provide an effective seal between the air filter and its associated air outlet.

52 Claims, 5 Drawing Sheets

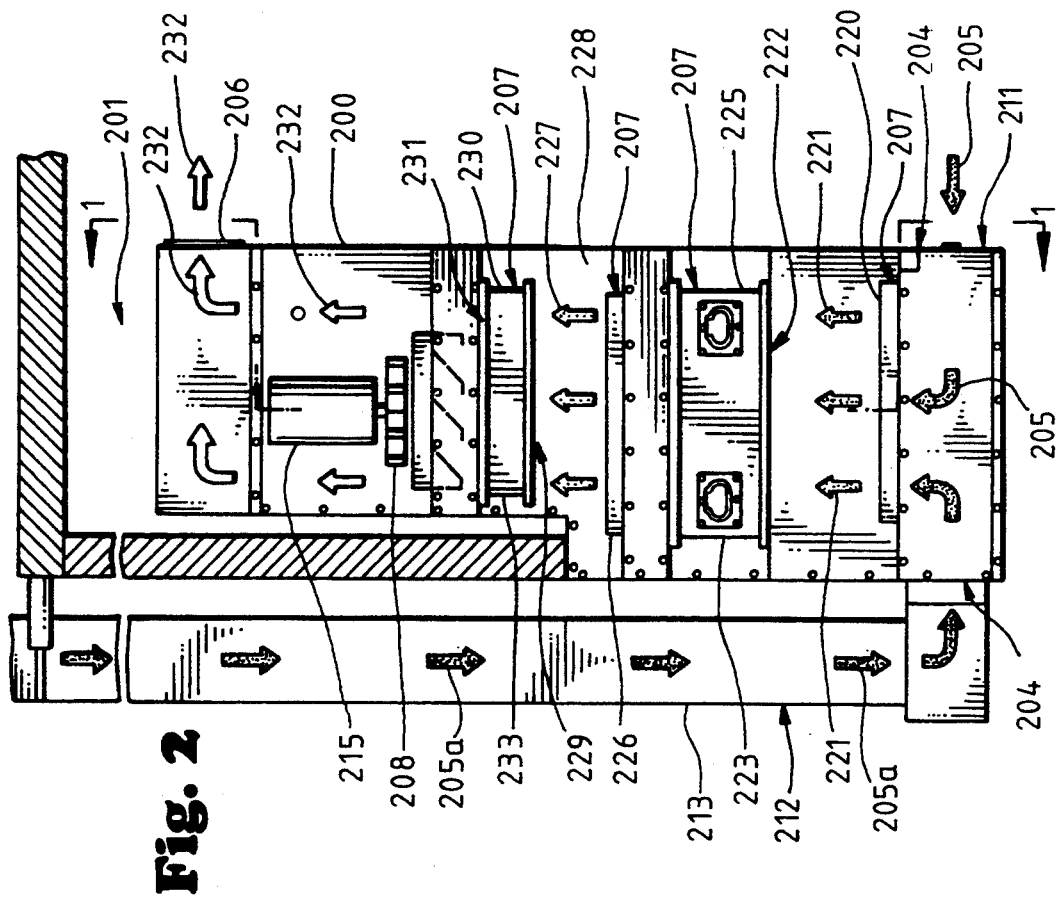
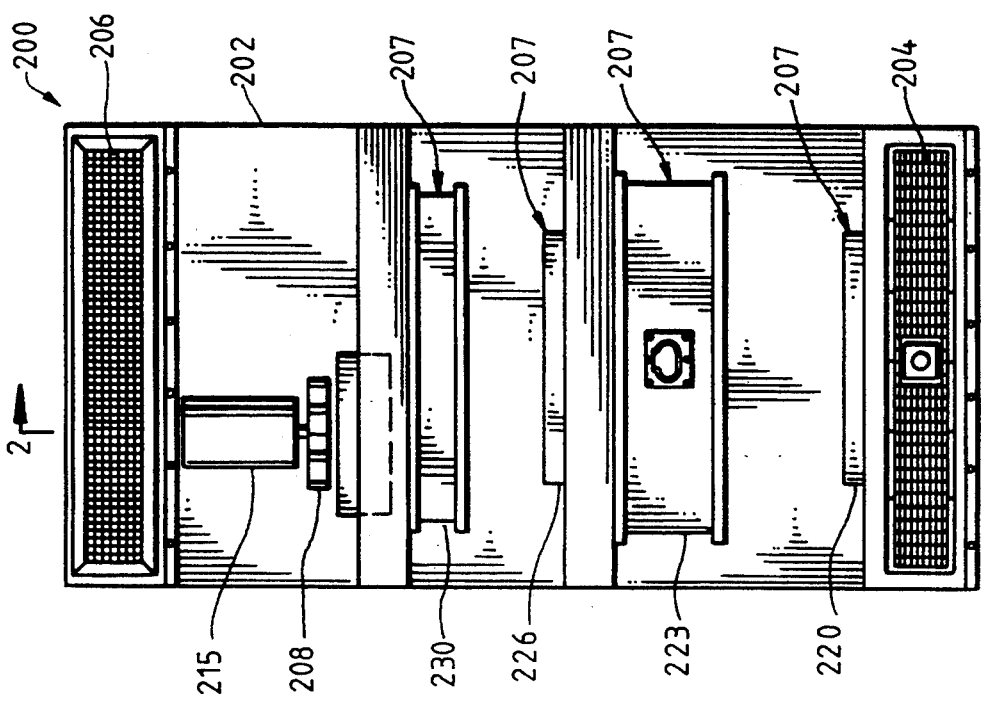
Fig. 2
Fig. 1

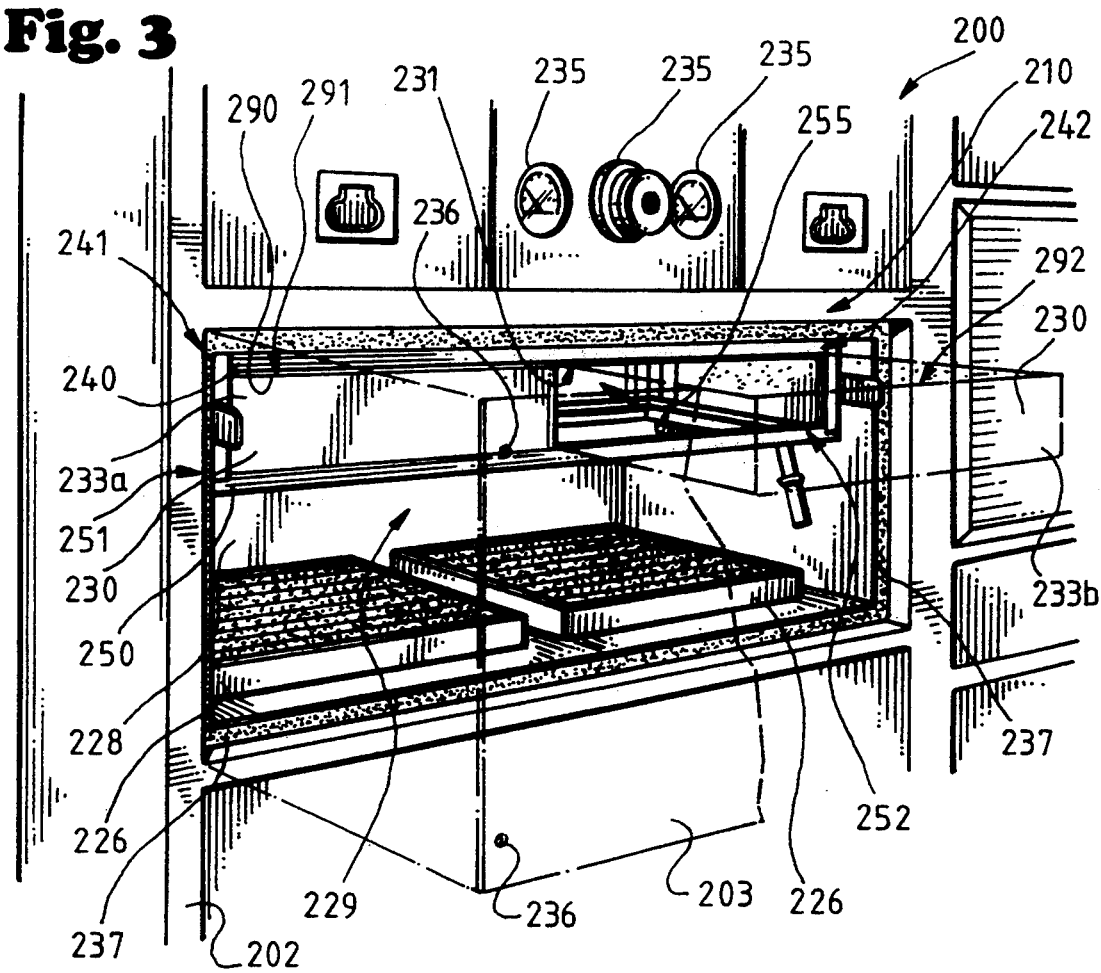

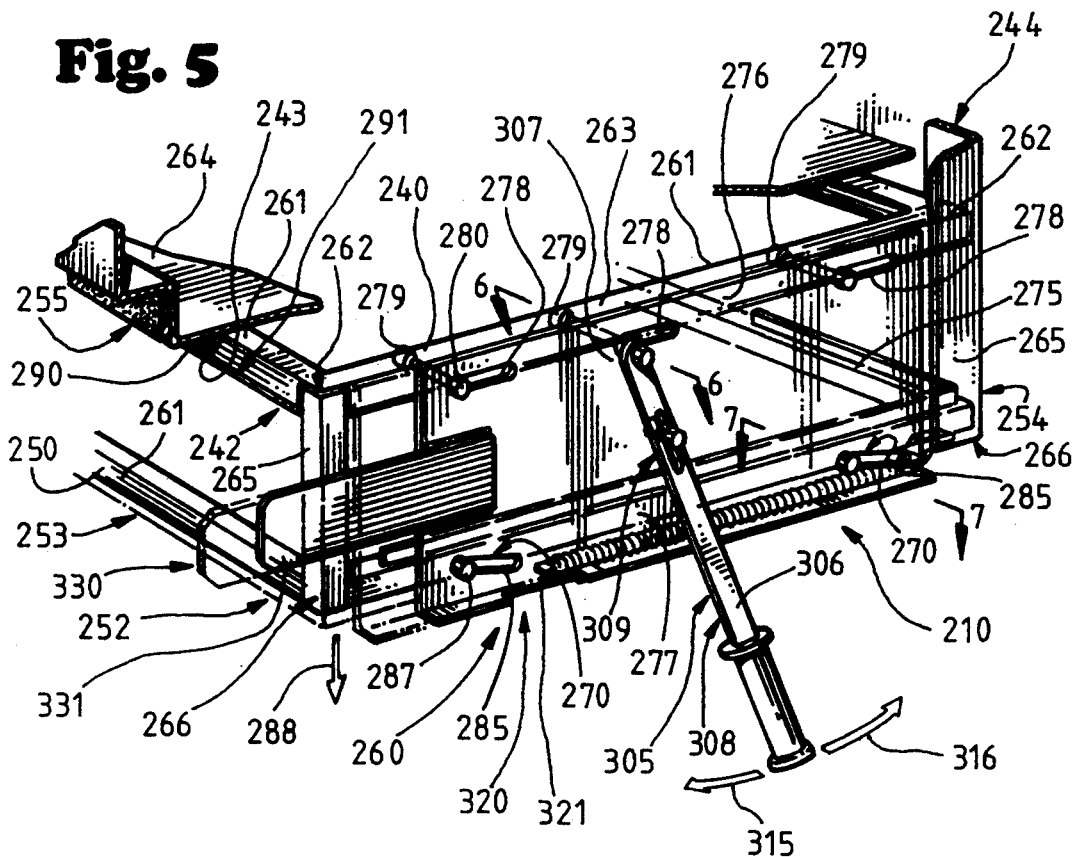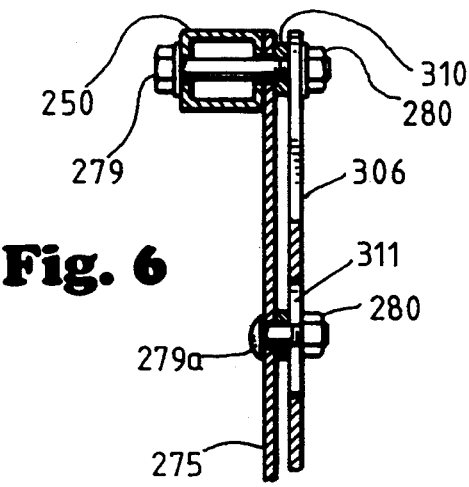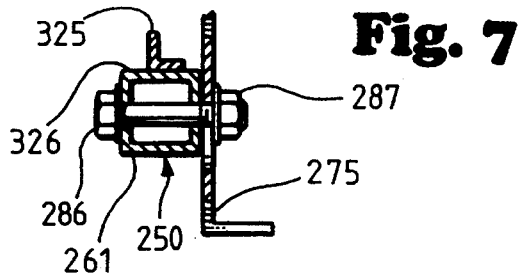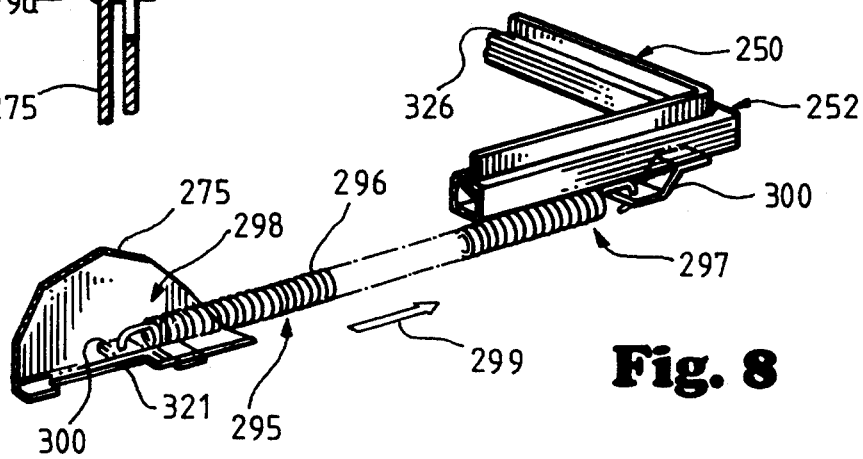

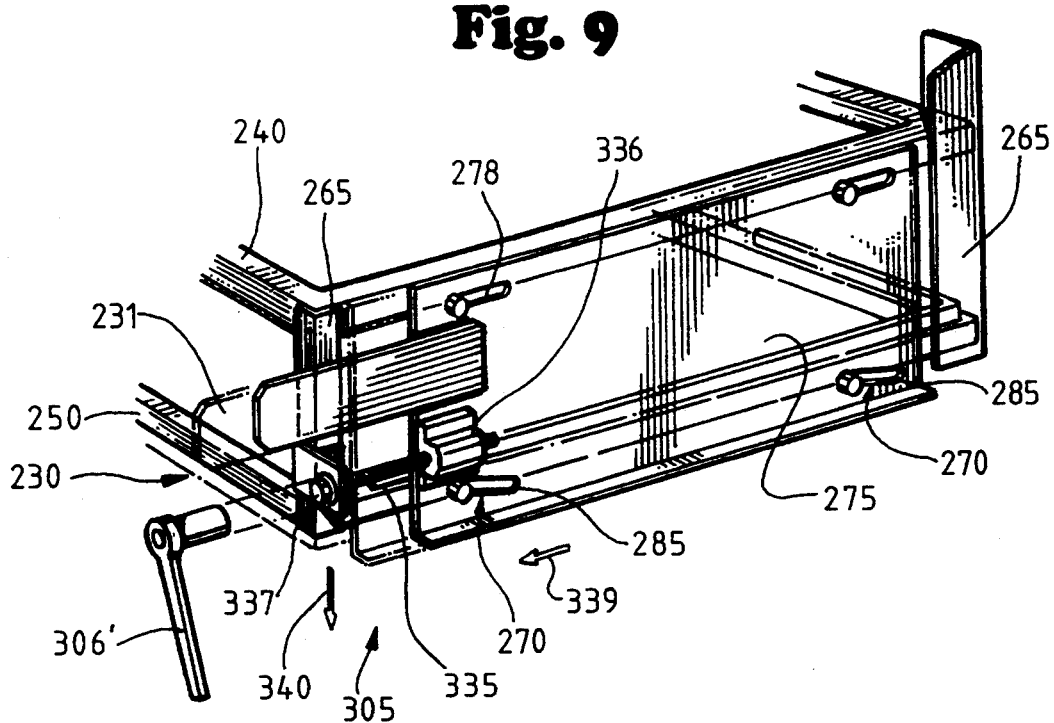
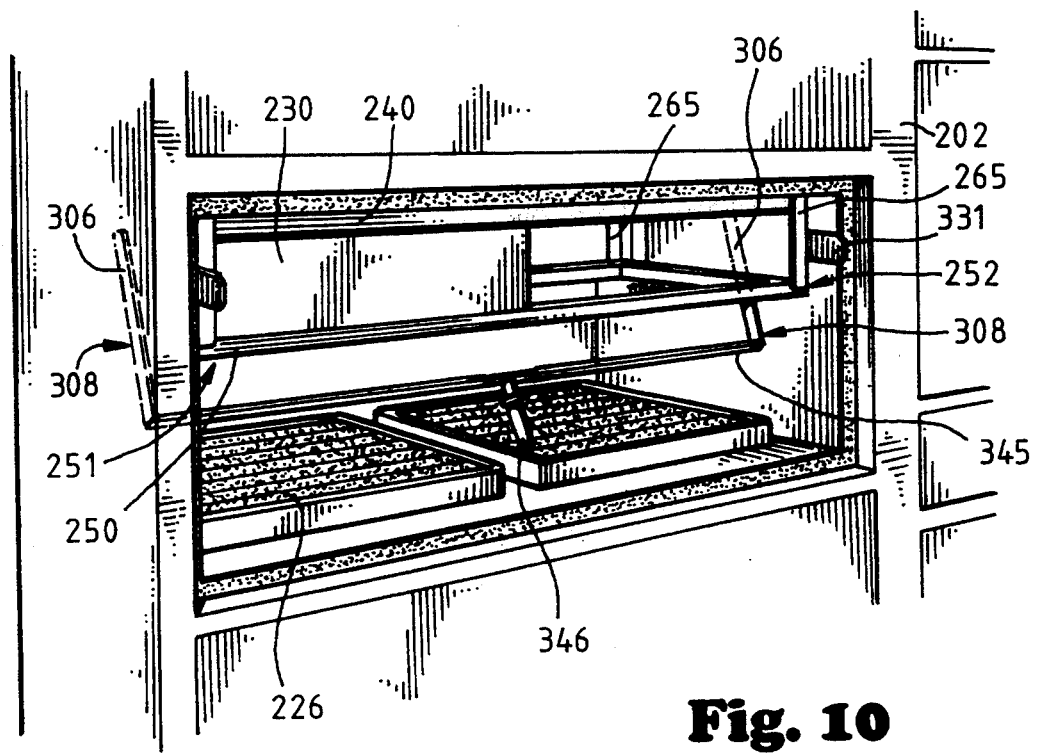

AIR FILTERING APPARATUS

BACKGROUND OF THE INVENTION

1. Field of the Invention

The invention relates to an air filtering apparatus, for providing filtered air to an enclosed space, including a filter mounting device for sealing the filter within the air filtering apparatus.

2. Description of the Prior Art

In enclosed spaces, or rooms, which contain delicate and sensitive computers and other control instrumentation, it is desirable to provide a clean, pressurized environment for such rooms. Examples of such enclosed spaces, or rooms, are computerized control rooms located in petrochemical refineries, chemical plants, pulp and paper mills, or other areas where corrosion and dust particles pose a hazard to computers or other delicate instrumentation. The clean, pressurized environment may be provided by air filtering apparatus which takes fresh, outdoor air, along with return room air, and passes it through an apparatus which includes a plurality of various types of filters which are designed to filter out undesired chemicals and/or particulate materials, whereby filtered and/or pressurized air may be provided to the enclosed space or room. These prior art air filtering apparatus may include different types of filters, such as: chemical filters, having an impregnated activated alumina media; high efficiency particulate arrestance ("HEPA") filters; and conventional non-woven cotton fabric type filters. With presently designed air filtering apparatus, a problem exists with respect to sealing the various types of filters within the air filtering apparatus, and in particular sealing chemical and HEPA filters within the air filtering apparatus. It is desired that all the air to be filtered passes through the various filters, and is not permitted to pass through the air filtering apparatus without passing through such filters. In the case of chemical and HEPA filters, such filters are disposed in metallic housings, or enclosures, and are adapted to be placed within the filtering apparatus and sealed with respect thereto, so that all the air which passes through the air filtering apparatus, passes through each of the various filters. After these filters are placed within the air filtering apparatus, they must be disposed in a sealing relationship within the air filtering apparatus.

Various methods have been proposed to mount such filters within the air filtering apparatus, and to sealingly dispose such filters within the air filtering apparatus. One of the most common methods is the use of strips of felt or nylon pile gasketing in the portion of the air filtering apparatus which receives the replaceable filters. In this regard, conventional filters must be routinely inspected and/or cleaned on a scheduled basis, as well as must eventually be replaced with a new filter. Conventional air filtering apparatus may have "filter tracks" into which the filters are slid into place into the air filtering apparatus. The felt or nylon pile gasketing is secured in the filter tracks to fill the voids between the filter and the filter tracks. These materials typically do not completely fill the gap between the surface of the filter tracks and the filter, particularly at the corners of the filters. The use of such gasketing material in the filter tracks may be particularly ineffective when it is desired to provide substantial filtering of the air being provided to a room containing computers, or other sensitive instrumentation. For example, the efficiency of some HEPA filters is rated at 99.97% efficiency when arresting, or filtering out, particles as small as 0.3 microns (0.000017 inch) in diameter, and some chemical filters are rated so as to provide the reduction of some contaminants to levels as low as 5 parts per billion. Accordingly, when it is desired to provide such substantial filtering, the desired objective is not achieved if air which is intended to be filtered by passing through such filters, instead can bypass the filter by leaking through the seals disposed at the corners of the filters and the filter tracks. Another disadvantage with the use of strips of gasketing material, against which the filter slides as it is being inserted into the air filtering apparatus, is that these sealing strips may wear rapidly with repeated use, as when the filters are cleaned and inspected, which thus further reduces the integrity of the air filtering apparatus.

Another method to provide sealing between the filter and the air filtering apparatus has been the use of foam gasketing material disposed between a filter and a frame in which the filter is disposed. The filter is clamped against the gasketing material by the use of a plurality of thumb screws or bolts, which are tightened to compress the filter against the foam gasket material, in a manner similar to that which is used to seal an oil pan of an automobile to the engine of the automobile. The use of a plurality of thumb screws or bolts can provide a sufficient seal between the filter and the air filtering apparatus, provided maintenance personnel servicing the filters exercise sufficient care to evenly tighten the bolts and/or thumb screws, so that equal pressure is exerted on the filter frame about its periphery, in a manner similar to that used when securing an oil pan to the engine of a motor vehicle. The problem with the use of a plurality of thumb screws and/or bolts is that typically the bolts and/or thumb screws are not evenly tightened and the resulting seal may not be effective in insuring that unfiltered air does not ultimately pass through the ineffective seal and through the air filtering apparatus, without having been filtered. If the bolts of an oil pan are not evenly tightened to apply an equal amount of pressure about the periphery of the oil pan, the fact that the seal is not properly made becomes readily apparent, in that oil will begin to leak. The fact that a proper seal has not been effected within an air filtering apparatus, between the filter and the air filtering apparatus, may not be so readily apparent, particularly when the intent is to filter out particles as small as 0.3 microns in diameter. Additionally, the procedure of tightening the plurality of thumb screws and/or bolts is very time consuming, since a great number of bolts and/or thumb screws are often required. The procedure of tightening the bolts and/or thumb screws is also made more difficult when a chemical filter is being installed and/or serviced or inspected, in that many chemical filters can weigh several hundred pounds.

Accordingly, prior to the development of the present invention, there has been no air filtering apparatus, or filter mounting device for use in an air filtering apparatus which: efficiently and easily provides an effective seal between a filter and its mating surface within an air filtering apparatus; does not slide a filter against a strip of gasketing material, which can cause undesired wear upon the strip of gasketing material; and provides an indication if a proper seal for the filter has not been made. Therefore, the art has sought an air filtering apparatus and a filter mounting device which: efficiently and easily provides an effective seal between a filter and its mating surface within an air filtering apparatus; does not require the filter to slide against, and potentially wear out, a strip of gasketing material; and provides an indication to maintenance personnel that the desired seal has not been effected.

SUMMARY OF THE INVENTION

In accordance with the invention, the foregoing advantages have been achieved through the present air filtering apparatus having a filter mounting device in accordance with the present invention. The filter mounting device, in accordance with the present invention, for use in an air filtering apparatus which includes a cabinet having at least one filter access door, a filter, and an air outlet for air exiting the filter, includes: a first frame having first and second ends and a front and a rear, and is adapted to be fixedly secured within the cabinet adjacent the filter access door and beneath the air outlet; a second frame, having first and second ends and a front and a rear, disposed beneath the first frame in a spaced relationship with respect to the first frame to define a filter receiving cavity with the second frame adapted to support the filter; and a means for substantially simultaneously moving the first and second ends of the second frame upwardly, from a first position which permits a filter to be loosely disposed within the filter receiving cavity, into a second position with the filter disposed in a sealed relationship with respect to the air outlet.

Another feature of the present invention is that the moving means may include at least one cam surface, associated with each of the first and second ends of the second frame, and which permits relative movement between the second frame and the cam surfaces and causes the second frame to move to, and from, the first position. A further feature of the present invention is that the moving means may include two slide plates with a slide plate disposed at both ends of the first and second frames; each slide plate having an upper and a lower end; and the lower end of each slide plate has the at least one cam surface associated therewith.

A further feature of the present invention is that the upper end of one slide plate may be mounted to the first end of the first frame and the upper end of the other slide plate may be connected to the second end of the first frame; each slide plate being movably mounted to the first frame for relative movement between each slide plate and the first frame in a direction toward and away from the front of the first frame. Another feature of the present invention is that the at least one cam surface may be at least one inclined slot formed in the lower end of each slide plate; and the first and second ends of the second frame each have at least one pin and each pin is disposed within one of the inclined slots of the slide plate.

An additional feature of the present invention is that a means for biasing the second frame into the second position may be provided, and the biasing means may be a spring, having first and second ends, disposed at each of the ends of the second frame, the first end of each spring being connected to an end of the second frame, and the second end of each spring being connected to a slide plate.

A further feature of the present invention is that the moving means may also include a means for actuating the moving means to provide relative movement between the second frame and the slide plates. The actuating means may be at least one handle connected to each of the first and second ends of the first frame, the at least one handle having an upper and a lower end, the upper end of the at least one handle being pivotally connected to at least one of the ends of the first frame, and the lower end of the at least one handle is connected to one of the slide plates. Another feature of the present invention is that the actuating means may be at least one threaded shaft which is received in at least one journal bearing associated with at least one slide plate.

A further feature of the present invention is an indicator means for indicating when the second frame is in the second position may be provided. The indicator means may be an elongate member secured to at least one slide plate, the elongate member extending outwardly toward the front of the first frame, and when the second frame is in the first position the elongate member is adapted to contact the filter access door and prevent the filter access door from being attached to the cabinet. Another feature of the present invention is that a means for locking the second frame in the first position may be provided, and the locking means may be at least one notched portion formed in at least one slide plate, and a handle pivotally mounted to the first frame member and connected to the at least one slide plate, is releasably received within the at least one notched portion to releasably lock the second frame in the first position. Another feature of the present invention is that the bottom of the first frame may have a gasket which is compressed by the filter abutting the gasket, when the second frame is in the second position.

The air filtering apparatus and filter mounting device of the present invention, when compared with previously proposed prior art air filtering apparatus and filter mounting devices, have the advantages of: efficiently and easily providing an effective seal between the filter and its mating surface within the air filtering apparatus; does not slide a filter against a strip of gasketing material; and provides a means for indicating that an effective seal has not been obtained.

BRIEF DESCRIPTION OF THE DRAWING

In the Drawing:

FIG. 1 is a front, partial cross-sectional view of an air filtering apparatus taken along line 1—1 of FIG. 2, in accordance with the present invention;

FIG. 2 is a side, partial cross-sectional view taken along line 2—2 of FIG. 1;

FIG. 3 is a perspective view of a portion of the air filtering apparatus of FIGS. 1 and 2;

FIG. 4 is a perspective view of a portion of a filter mounting device, in accordance with the present invention, this view being taken looking upwardly into the air filtering apparatus of FIG. 3;

FIG. 5 is a partial cross-sectional, perspective view of the filter mounting device in accordance with the present invention;

FIG. 6 is a partial cross-sectional view taken along line 6—6 of FIG. 5;

FIG. 7 is a partial cross-sectional view taken along line 7—7 of FIG. 5;

FIG. 8 is a partial cross-sectional, exploded view of a portion of the filter mounting device of FIG. 5;

FIG. 9 is a partial cross-sectional, perspective view of another embodiment of a filter mounting device in accordance with the present invention;

FIG. 10 is a perspective view of an air filtering apparatus provided with another embodiment of an actuator means for the filter mounting device in accordance with the present invention;

Figure 11:
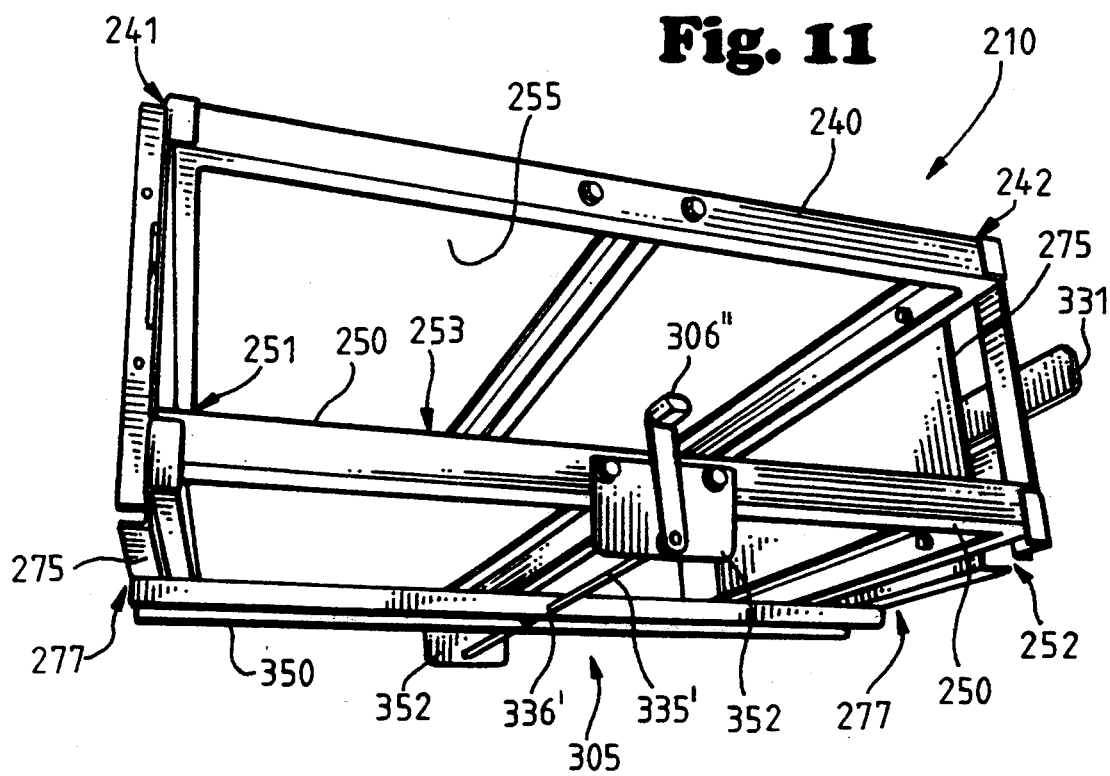
FIG. 11 is a perspective view, looking upwardly, toward another embodiment of a filter mounting device, in accordance with the present invention.

While the invention will be described in connection with the preferred embodiment, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF THE INVENTION

With reference to FIGS. 1 and 2, an air filtering apparatus 200 for providing filtered air to an enclosed space, or room, 201 is shown to generally comprise: a cabinet 202, including at least one filter access door 203 (FIG. 3); an unfiltered air inlet in the cabinet 202 for the entry of unfiltered air, as shown by arrows 205; a filtered air outlet 206; at least one filter 207 disposed in cabinet 202; a blower 208 disposed in the cabinet 202 for drawing unfiltered air 205 from the unfiltered air inlet 204, through the at least one filter 207 and outwardly through the filtered air outlet 206; and a filter mounting device 210 which is shown and will be hereinafter described in connection with FIGS. 3–12. Unfiltered air inlet 204 may include both a room return air inlet 211, and a fresh air, or outdoor air inlet 212, which may include a conventional duct 213 through which unfiltered outdoor air 205a may pass and enter cabinet 202.

Still with reference to FIGS. 1 and 2, cabinet 202 may be manufactured in a conventional manner from any suitable material, such as galvanized steel. Blower 208 is of conventional construction, and may be made of stainless steel, and for illustrative purposes may be direct driven by a ¾ horse power 3600 rpm motor 215. Various types of conventional filters 207 may be disposed within cabinet 202, and air filtering apparatus 200 is illustrated as having four filters 207, in order to provide clean, pressurized filtered air to enclosed space, or room, 201.

The first filter 220 through which unfiltered air 205, 205a passes through as it is drawn upwardly through cabinet 202 by blower 208, is a conventional pleated, disposable type filter consisting of a non-woven cotton and synthetic fabric media and is designed to remove and retain larger particulate matter contained in the unfiltered air 205, 205a. The first filter, or prefilter, 220 is of conventional construction, and may be any type of filter capable of removing and retaining larger particulate matter, provided it is designed to eliminate the possibility of the filter media pulling away from the filter.

Still with reference to FIGS. 1 and 2, after the air, as shown by arrows 221 in FIG. 2, has passed through the first filter 220, the air 221 may then enter air inlet 222 of the second filter 207, or chemical filter 223, and then pass outwardly through air outlet 224 of chemical filter 223. The second filter 207, or chemical filter 223, may be of conventional construction, including a metallic enclosure, or housing 225 containing an impregnated activated alumina media, which is a chemisorbant media designed to remove gaseous vapors such as $H_2S$, $SO_2$, $SO_3$, ethylene (olefins), formaldehyde and methyl/ethyl mercaptans. Such media may also have the ability to adsorb and absorb products of aldehydes, light organic vapors, organic acids and inorganic acids. Impregnated activated alumina removes gaseous contaminants from the air, or airstream, 221 by adsorption, absorption, and chemical oxidation. As previously discussed, such a chemical filter 223 may weigh several hundred pounds.

Still with reference to FIGS. 1 and 2, the air exiting chemical filter 223 may then pass through a third, or "refilter" filter 207, or filter 226. Filter 226 is of the same construction as the first filter 220, previously described, and its purpose is to remove and retain particulate matter that may become dislodged from the chemical media of chemical filter 223. The air exiting filter 226, as shown by arrows 227 in FIG. 2, is enclosed within a cavity 228, within cabinet 202 which provides an air inlet 229 into the fourth filter 207, or HEPA filter 230, which air 227 then passes outwardly through the air outlet 231 associated with filter 230. The filtered air, as shown by arrows 232 in FIG. 2, then passes upwardly through cabinet 202 and outwardly through filtered air outlet 206 into room 202. HEPA filter preferably is a conventional high efficiency particulate arrestance filter which utilizes a waterproofed, fire retardant fiberglass media for filtering. The filtering media is disposed within a conventional metallic housing or enclosure 233, which is typically made from anodized extruded aluminum. As previously described, the fourth HEPA filter 230 may have a 99.97% efficiency rating, with respect to filtering particles having a diameter of 0.3 microns, or 0.0000117 inches, in diameter. The operation of air filtering apparatus 200 may be controlled by conventional controls, which may include conventional pressure gauges 235, as illustrated in FIG. 3.

With reference to FIGS. 3 and 4, the filter access door 203 of air filtering apparatus 200 is illustrated as being removed from cabinet 202, with two filters 226 being disposed within cavity 228 which provides the air inlet 229 for HEPA filters 230 which are disposed above filters 226. Air outlet 231 associated with HEPA 233 is shown in FIG. 4. Two HEPA filters 230 are illustrated in the embodiment of air filtering apparatus 200 of FIG. 3, with one of the HEPA housings 233a being illustrated disposed within cabinet 202, and the second HEPA filter housing 233b being illustrated about to be disposed within filter mounting device 210 of air filtering apparatus 200. Filter access door 203 may be attached to cabinet 202 as by a plurality of screws, or bolts, 236, and a conventional gasket 237 disposed on cabinet 202 cooperates with filter access door 203 to seal off the cavity 228 of cabinet 202 when filter access door 203 is attached to cabinet 202.

With reference to FIGS. 3–5, filter mounting device 210, in accordance with the present invention, is shown to generally include a first frame 240, having first and second ends 241, 242 and a front 243 and a rear 244, with first frame, or upper frame, 240 being fixedly secured within cabinet 202, generally adjacent filter access door 203 and beneath the air outlet 231 associated with HEPA filter 230; a second frame, or lower frame, 250 having first and second ends 251, 252 and a front 253 and a rear 254, disposed beneath the first frame 240 in a spaced relationship with respect to the first frame 240 to define a filter receiving cavity 255 (see also FIG. 3) with filter 230 being disposed upon, and supported by, the second frame 250, as shown in FIG. 3; and a means for substantially simultaneously moving 260 the first and second ends 251, 252 of the second frame 250 upwardly, from a first position, as illustrated in FIGS. 3 and 4, which permits the filter 230 to be loosely disposed within the filter receiving cavity 255, toward the first frame 240, into a second position, as illustrated in FIG. 5, with filter 230 disposed in a sealed relationship with respect to air outlet 231, as will be hereinafter described in greater detail.

Still with reference to FIGS. 3–5, first frame 240 is preferably a rigid, rectangular shaped frame formed of four metal square-shaped channel members 261 which are joined at their corners 262 in a conventional manner, as by welding, to form a rigid rectangular-shaped frame. Channel members 261 may be fixedly secured within cabinet 202, as by welding the upper surface 263 of channel members 261 to a divider plate 264 disposed within cabinet 202. A downwardly depending guide means, or length of angle iron, 265 is preferably secured to each corner 262 of first frame 240, as by welding, the guide function thereof which will be hereinafter described in greater detail. The second frame 250 is of the same construction as first frame 240, and likewise includes four square-shaped channel members 261 welded at their corners 262 to form a rigid rectangular-shaped frame. Channel members 261 are preferably made of a suitable metallic material, such as galvanized steel; however, other materials having the requisite strength characteristics may be utilized for frames 240, 250, as well as other cross-sectional configurations may be utilized. The general shape of first and second frames 240, 250 is selected to generally conform to the shape of the particular filter, such as HEPA filter 230 with which filter mounting device 210 is to be utilized. For example, when two square shaped filter housings 233, such as illustrated in FIG. 3 are to be mounted by filter mounting device 210, the first and second frames 240, 250 have a conforming rectangular shape as illustrated. If only one filter, having a square shape is to be supported, the shape of first and second frames 240 would typically also have a square configuration. As will be hereinafter described in greater detail, second frame 250 may move upwardly and downwardly with respect to first frame 240, and this upward, or downward movement is to some extent guided by the downwardly extending angle iron members 265 affixed to first frame 240, the lower ends 266 of angle iron members 265 being disposed in close proximity to the corners 262 of second frame 250 as shown in FIGS. 4 and 5.

With reference to FIGS. 4 and 5, moving means 260 will be described in greater detail. Moving means 260 preferably includes at least one cam surface 270 associated with each of the first and second ends 251, 252 of second frame 250, the cam surfaces 270 permitting relative movement between the second frame 250 and the cam surfaces 270, which causes the second frame 250 to move to, and from, the first position of second frame 250 as illustrated in FIGS. 3 and 4, to the second position of second frame 250 illustrated in FIG. 5, wherein filter 230 is disposed in a sealed relationship with respect to air outlet 231 associated with first frame 240 and filter 230. Preferably, moving means 260 includes two slide plates 275 with a slide plate 275 being disposed at both ends 241, 242, 251, 252 of the first and second frames 240, 250, only one slide plate 275 being illustrated at the second ends 242, 252, of the first and second frames 240, 250. The other slide plate 275 is of the same design and construction as that illustrated in FIGS. 4 and 5. Each slide plate 275 has an upper and a lower end 276, 277 and the lower end 277 of each slide plate has the at least one cam surface 270 associated therewith. Preferably, as illustrated in FIG. 5, two cam surfaces 270 are provided for each slide plate 275. Preferably, the upper end of each slide plate is mounted to a respective end 241, 242 of the first frame 240, and each slide plate 275 is movably mounted to the first frame 240 for relative movement between the slide plate 275 and the first frame 240 in a direction toward and away from the front 243 of first frame 240. Such relative movement may be provided as by providing a pair of slots 278 in the upper end of slide plate 275, and passing a bolt 279 through channel member 261 of frame 240 and through slots 278 of slide plate 275, as illustrated in FIGS. 5 and 6. A combination washer-lock nut 280 is threaded to bolt 279, whereby slide plate 275 may move with respect to first frame 240 in a direction parallel to the plane in which lies first frame 240. As seen in FIG. 5, slots 278 lie in a plane which is parallel with channel members 261 of first frame 240.

Still with reference to FIGS. 4 and 5, cam surfaces 270 are preferably provided by two inclined slots 285 formed in the lower end 277 of each slide plate 275, slots 285 being disposed at an acute angle with respect to the plane in which lies second frame 250. The first and second ends 251, 252 of second frame 250 preferably each have at least one bolt, or pin, 286 associated therewith which passes through channel member 261 of second frame 250 and are disposed within inclined slots 285 of slide plate 275. As shown in FIG. 7, the bolt, or pin, 286 is slidably secured against slide plate 275, as by a combination washer-lock nut 287, which permits sliding movement of slide plate 275 with respect to second frame 250. It is thus seen that as slide plate 275 moves toward the front 243 of first frame 240, or toward the location of filter access door 203 at the front of cabinet 202, slide plate 275 will move with respect to first frame 240 as bolts 279 travel along slots 278 in the upper end 276 of slide plate 275, and second frame 250 will simultaneously move downwardly, in the direction shown by arrow 288 of FIG. 5, as pins 286 moves downwardly along cam surfaces 270, or inclined slots 285, while downwardly depending angle iron members 265 guide and restrict movement of second frame 250 in the direction of arrow 288. This position, or first position, of second frame 250 is illustrated in phantom lines in FIG. 5, wherein a filter 230 may be inserted and loosely disposed in filter receiving cavity 255, and corresponds to the first position of filter mounting device 210 illustrated in FIGS. 3 and 4. Upon slide plates 275 then being moved rearwardly toward the rear 244 of first frame 240, pins 286 of second frame 250 will be cammed upwardly by inclined slots 285 until second frame 250 is once again in its second, sealed position illustrated in solid lines in FIG. 5.

As previously described, when slide plates 275 are disposed toward the front 243 of first frame 240, as illustrated in FIGS. 3 and 4, second frame 250 will be in its lower most position, as shown in phantom lines in FIG. 5. This first position, permits HEPA filter 230 to be inserted within filter receiving cavity 255, without HEPA filter 230 contacting a foam gasket 290 disposed on the bottom 291 of first frame 240, as filter 230 is inserted into filter receiving cavity 255. Upon slide plates 275 moving inwardly of cabinet 202 toward the rear 244 of first frame 240 into the second position, illustrated in FIG. 5, the second frame 250 moves upwardly with respect to first frame 240, and the top 292 (FIG. 3) of filter 230 is compressed against foam gasket 290 to provide the desired sealed relationship between filter 230 with respect to its air outlet 231, or the desired sealed relationship between the top 292 of filter 230 and the bottom 291 of first frame 240.

Filter mounting device 210 as illustrated in FIGS. 3–5 may preferably include a means for biasing 295 the second frame 250 into its second position illustrated in FIG. 5. Preferably biasing means 295 is a spring 296 having first and second ends 297, 298, a spring 296 being disposed at each of the ends 251, 252 of second frame 250. As shown in FIG. 8, the first end of each spring 296 is connected to an end of the second frame 250, the second end 252 of second frame 250 being illustrated in FIG. 8, and the second end 298 of each spring 296 is connected to a slide plate 275. It should be readily apparent that biasing means 295, or spring 296, exerts a force upon slide plate 275 in the direction shown by arrow 299 in FIG. 8, since the movement of second frame 250 is guided and restrained by downwardly depending angle iron members 265 secured to first frame 240. Spring 296 may be secured to second frame 250 and slide plate 275 in any conventional manner, such as by tabs 300, as shown in FIG. 8. With biasing means 295, or spring 296, exerting a force upon slide plates 275 in the direction shown by arrow 299, a force is thus exerted upon second frame 250 to bias it in an upward direction to cause a force to always be applied to filter 230 to urge it to compress against seal 290 to provide the desired sealed relationship between filter 230 with respect to air outlet 231.

Moving means 260 may also include a means for actuating 305 the moving means 260 to provide the desired relative movement between the second frame 240 and the slide plate 275. As seen in FIGS. 4–6, the actuating means 305 may preferably be at least one handle 306 connected to each of the first and second ends 241, 242 of the first frame 240. The handle 306, illustrated in FIG. 5, is associated with the second end 242 of first frame 240, a handle 306 of the same construction being associated with the first end 241 of the first frame 240 in a similar manner. Handle 306 has upper and lower ends 307, 308, and the upper end 307 of handle 306 is pivotally connected to the end 242 of the first frame 240, and a portion of the lower end 308, or lower intermediate portion 309 of handle 306 is connected to slide plate 275. As shown in FIG. 6, a bolt 279 also passes through channel member 261 of upper frame, or first frame, 240 and through a slot 278, and a combination washer-lock nut 280 is threaded onto bolt 279, with a spacer 310 being disposed between slide plate 275 and handle 306. Handle 306 is provided with a slot 311, and a shorter bolt 279a passes through slide plate 275, and has a combination washer-lock nut 280 threaded thereon, with a spacer 310 disposed between slide plate 275 and handle 306. Upon rotation of handle 306 in the direction of arrow 315 of FIG. 5, with respect to the first frame 240, bolt 279a bears against slide plate 275 to cause slide plate 275 to move toward the front 243 of first frame 240, whereby relative movement is provided between the second frame 250 and the cam surfaces 270 of each slide plate 275, which in turn causes the second frame 250 to move to its first position as illustrated in FIGS. 3 and 4. Rotation of handle 306 in the direction of arrow 316 shown in FIG. 5, causes second frame 250 to move from its first position, illustrated in FIGS. 3 and 4, to its second position illustrated in FIG. 5.

Since the filter mounting device 210 of FIGS. 3–5 may be preferably biased into its second position as illustrated in FIG. 5, by biasing means 295, as previously described, filter mounting device 210 may include a means for locking 320 the second frame 250 in the first position illustrated in FIGS. 3 and 4, so that it is not necessary for maintenance personnel to pull handle 306 in the direction shown by arrow 315 in FIG. 5, and maintain a force on handle 306 against the biasing force of biasing means 295, or spring 296, when it is desired to lower second frame 250 to place it in its first open position illustrated in FIGS. 3 and 4. Locking means 320 may be preferably provided by at least one notched portion 321 formed in slide plates 275, whereby upon handle 306 being moved in the direction of arrow 315, handle 306 may be releasably received within notched portion 321 to releasably lock the second, or lower, frame 250 in the first position illustrated in FIGS. 3 and 4, whereby filter 230 may be inserted, or removed from, filter receiving cavity 255 as previously described. As shown in FIGS. 4, 5, 7, and 8, the second, or lower frame 250 may have an upwardly extending lip 325 on a portion of the top 326 of the second frame 250. Lip 325 assists in the positioning of filter 320 upon the second frame 250.

Filter mounting device 210 may be provided with an indicator means 330 for indicating when the second frame 250 is in its first position, as shown in FIGS. 3 and 4, when filter 230 is not sealingly disposed with respect to its air outlet 231. Preferably, indicator means 330, as shown in FIGS. 3–5 may be an elongate member, or elongate plate, 331 secured to at least one slide plate 275, with the elongate member 331 extending outwardly toward the front 241 of the first, or upper frame 240. In FIG. 5, indicator means 330, or elongate member 331, is illustrated in solid lines, when the second frame 250 is in its second, sealed position, and elongate member 331 is illustrated in phantom lines when second frame 250 is in its first, unsealed position as illustrated in FIGS. 3 and 4. When second frame 250 is in its first, unsealed position, elongate member 331 protrudes outwardly from cabinet 202 and contacts filter access door 203 and prevents the filter access door 203 from being attached to the cabinet 202. This feature is best seen in FIG. 4, wherein elongate member 231 of indicator means 230 is seen to project beyond gasket 237, into the space in which filter access door 203 would be received. Thus, if maintenance personnel forget to move handles 306 in the direction shown by arrow 316 of FIG. 5 to place second frame 250 in its second position illustrated in FIG. 5, such maintenance personnel will readily realize that it is necessary to dispose second frame 250 in its second, sealed position before attaching filter access door 203 to cabinet 202 of air filtering apparatus 200.

With reference to FIG. 9, filter mounting device 210 is illustrated having another embodiment of actuating means 305 being illustrated. Actuating means 305 in FIG. 9 is at least one threaded shaft 335 which is received in at least one journal bearing 336 associated with at least one slide plate 275. Preferably, each slide plate 275 is provided with a threaded shaft 335 and journal bearing 336. Upon rotation of removeable crank, or handle, 306' while it is engaged with the bolt head 337 of threaded shaft 335, threaded shaft 335 rotates within journal bearing 336. Journal bearing 336 is fixedly secured to slide plate 275, as by welding, and threaded shaft 335 is fixedly secured with respect to first frame 240, as by mounting threaded shaft 337 within a bracket 338 welded to the angle iron member 265 secured to first frame 240. Upon rotation of crank 306' in a clockwise direction, the rotation of threaded shaft 335 will cause slide plate 275 to move in the direction shown by arrow 339, which provides relative movement between the second frame 250 and the cam surfaces 270, of each slide plate 275 to cause second frame 250 to move to its first position by moving downwardly in the direction shown by arrow 340, as previously described in connection with FIG. 5. It should be noted that all the other components of filter mounting device 210 shown in FIG. 9 are identical to those previously described and which bear the same reference numerals. It is should be noted that slide plate 275 only differs from slide plate 275 illustrated in FIG. 5, in that the locking means 320, or notched portion 321 is not provided. The use of actuating means 305 having at least one threaded shaft 335 has been found to be useful when the weight of the filter disposed upon second frame 250 is substantial, as in the case of a chemical filter 223, as previously described.

With reference to FIG. 10, another embodiment of actuating means 305 is illustrated. The construction of filter mounting device 210 illustrated in FIG. 10 is identical to that previously described in connection with FIGS. 3-5, with the exception of actuating means 305. This embodiment of actuating means 305 includes a connector member 345 which is attached to the lower ends 308 of each handle 306, and connector member 345 has another handle 346 associated with connector member 345. It will be readily apparent that the use of connector member 345 and auxiliary handle 346 assist in the simultaneous movement of handles 306 to help assist in substantially simultaneously moving the first and second ends 251, 252 of second frame 250 upwardly into its desired second, sealing position, as previously described.

Figure 12:
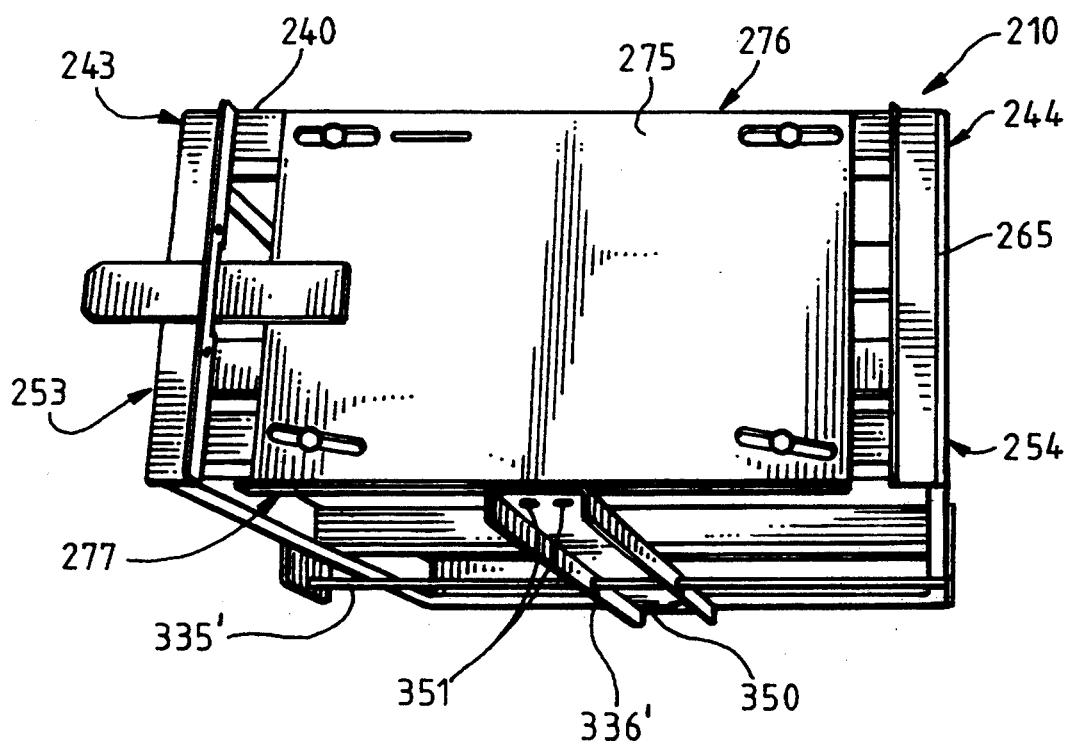
FIG. 12 is a perspective view, looking upwardly from the side of the filter mounting device of FIG. 11.

With respect to FIGS. 11 and 12, another embodiment of actuating means 305 is illustrated. As with the embodiment of actuating means 305 illustrated in. FIG. 9, the actuating means 305 illustrated in FIGS. 11 and 12 is particularly suited for use with heavy filters, such as chemical filters 223. The same reference numerals will be used for components previously described, and primed referenced numerals will be utilized for components which are similar in design and construction to those previously described. This embodiment of actuating means 305 preferably includes at least one threaded shaft 335' which is received in at least one journal bearing 336' associated with at least one slide plate 275. A U-shaped connector member 350 is fixedly secured to the lower end 277 of each slide plate 275, as by bolts 351. Journal bearing 336' may be readily provided as by merely threading the openings in U-shaped connector member 350 through which shaft 335' passes. The ends of threaded shaft 335' are journaled for rotation in downwardly depending plate members 352 which are fixedly secured to the front and rear channel members 261 of second frame 250. The end of threaded shaft 335' disposed at the front 253 of second frame 250 is provided with a crank handle 306". By rotating crank handle 306" in a clockwise direction, slide plates 275 are moved toward the front 253 of second frame 250 via the rotation of threaded shaft 335' in journal bearing 336' of U-shaped connector member 350, which causes second frame 250 to move downwardly into its first position as illustrated in FIGS. 3 and 4, to permit a filter, such as a chemical filter 223 to be inserted within filter receiving cavity 255 of filter mounting device 210, as previously described.

It should be noted that the use of the term "loosely disposed" in this specification and the claims appended hereto, as describing the first position of second frame 250 means that a filter may be disposed within the filter receiving cavity 255, without substantial contact, or substantial sliding movement, of the top of a filter against gasket 290, and preferably no contacting of filter 290, until such time as the second frame 250.is raised to compress gasket 290, as previously described. It should also be noted that although two cam surfaces 270 are illustrated in all of the slide plates 275, one, two, or more cam surfaces can provide the desired relative motion between first and second frames 40, 250. Likewise, any desired number of slots 278 may be utilized to connect the upper end 276 of each slide plate to the first frame 240. It should also be noted that gasket 290 could be provided upon the top of the filter, rather than on the underside of the first frame 240. Alternatively, both the top of the filter and the underside of the first frame could be provided with a gasket, both gaskets being compressed through the use of filter mounting device 210.

It is to be understood that the invention is not limited to the exact details of construction, operation, exact materials or embodiment shown and described as obvious modifications and equivalents will be apparent to one skilled in the art. For example, the slide plates could have their upper ends not connected to the first frame, with a handle supporting the slide plates with their cam surfaces in the proper location with respect to the second frame. Accordingly, the invention is therefor to be limited only by the scope of the appended claims.

I claim:

1. A filter mounting device for use in an air filtering apparatus which includes a cabinet having at least one filter access door, a filter, and an air outlet for air exiting the filter, comprising:
   a) a first frame having first and second ends and a front and a rear, and adapted to be fixedly secured within the cabinet adjacent the filter access door and beneath the air outlet;
   b) a second frame having first and second ends and a front and a rear, disposed beneath the first frame in a spaced relationship with respect to the first frame to define a filter receiving cavity with the second frame adapted to support the filter;
   c) a means for substantially simultaneously moving the first and second ends of the second frame upwardly, from a first position which permits a filter to be loosely disposed within the filter receiving cavity, toward the first frame into a second position with the filter disposed in a sealed relationship with respect to the air outlet, including at least cam surface, associated with each of the first and second ends of the second frame; the cam surfaces permitting relative movement between the second frame and the cam surfaces and causes the second frame to move to, and from, the first position; and
   (d) a means for biasing the second frame into the second position, the biasing means being a spring, having first and second ends, disposed at each of the ends of the second frame, the first end of each spring being connected to an end of the second frame, and the second end of each spring being connected to a slide plate.

2. The filter mounting device of claim 1, wherein the moving means includes two slide plates with a slide plate disposed at both ends of the first and second frames; each slide plate having an upper and a lower end; and the lower end of each slide plate has the at least one cam surface associated therewith.

3. The filter mounting device of claim 2, wherein the upper end of one slide plate is mounted to the first end of the first frame and the upper end of the other slide plate is connected to the second end of the first frame; each slide plate being movably mounted to the first frame for relative movement between each slide plate and the first frame in a direction toward and away from the front of the first frame.

4. The filter mounting device of claim 2, wherein the at least one cam surface is at least one inclined slot formed in the lower end of each slide plate; and the first and second ends of the second frame each have at least one pin, and each pin is disposed within one of the inclined slots of the slide plate.

5. The filter mounting device of claim 2, wherein the moving means further includes a means for actuating the moving means to provide relative movement between the second frame the slide plates.

6. The filter mounting device of claim 5, wherein the actuating means is at least one handle connected to each of the first and second ends of the first frame, the at least one handle having an upper and a lower end, the upper end of the at least one handle being pivotally connected to at least one of the ends of the first frame, and the lower end of the at least one handle connected to one of the slide plates whereby upon rotation of the at least one handle, with respect to the first frame, relative movement is provided between the second frame and the cam surfaces of each slide plate to cause the second frame to move to, and from, the first position.

7. The filter mounting device of claim 5, wherein the actuating means is at least one threaded shaft which is received in at least one journal bearing associated with at least one slide plate, whereby upon rotation of the at least one threaded shaft within the at least one journal bearing, relative movement is provided between the second frame and the cam surfaces of each slide plate to cause the second frame to move to, and from, the first position.

8. The filter mounting device of claim 2, including an indicator means for indicating when the second frame is in the first position.

9. The filter mounting device of claim 8, wherein the indicator means is an elongate member secured to at least one slide plate, the elongate member extending outwardly toward the front of the first frame, and when the second frame is in the first position the elongate member is adapted to contact the filter access door and prevent the filter access door from being attached to the cabinet.

10. The filter mounting device of claim 2, wherein the second frame has an upwardly extending lip on a portion of the top of the second frame, which lip positions the filter upon the second frame.

11. The filter mounting device of claim 2, including a means for locking the second frame in the first position.

12. The filter mounting device of claim 11, wherein the locking means is at least one notched portion formed in at least one slide plate, and a handle pivotally mounted to the first member and connected to at least one slide plate, is releasably received within the at least one notched portion to releasably lock the second frame in the first position.

13. The filter mounting device of claim 2, wherein the bottom of the first frame has a gasket which is compressed by the filter abutting the gasket, when the second frame is in the second position.

14. An air filtering apparatus for providing filtered air to an enclosed space, comprising:
a) a cabinet, including at least one filter access door;
b) an unfiltered air inlet in the cabinet for unfiltered air;
c) a filtered air outlet in the cabinet;
d) at least one filter disposed in the cabinet, the at least one filter having an air inlet and an air outlet associated therewith in the cabinet;
e) a blower disposed in the cabinet for drawing unfiltered air from the unfiltered air inlet, through the at least one filter and outwardly through the filtered air outlet;
f) a filter mounting device disposed in the cabinet, the filter mounting device including a first frame, having first and second ends and a front and a rear, fixedly secured within the cabinet adjacent the at least one filter access door and beneath the air outlet associated with the at least one filter; a second frame, having first and second ends and a front and a rear, disposed beneath the first frame in a spaced relationship with respect to the first frame to define a filter receiving cavity with the at least one filter being disposed upon, and supported by, the second frame; and a means for substantially simultaneously moving the first and second ends of the second frame upwardly, from a first position which permits the at least one filter to be loosely disposed within the filter receiving cavity, toward the first frame, into a second position with the at least one filter disposed in a sealed relationship with respect to the air outlet, including at least one cam surface, associated with each of the first and second ends of the second frame; the cam surfaces permitting relative movement between the second frame and the cam surfaces and causes the second frame to move to, and from, the first position; and
(g) a means for biasing the second frame into the second position, the biasing means being a spring, having first and second ends, disposed at each of the ends of the second frame, the first end of each spring being connected to an end of the second frame, and the second end of each spring being connected to a slide plate.

15. The air filtering apparatus of claim 14, wherein the moving means includes two slide plates with a slide plate disposed at both ends of the first and second frames; each slide plate having an upper and a lower end; and the lower end of each slide plate has the at least one cam surface associated therewith.

16. The air filtering apparatus of claim 15, wherein the upper end of one slide plate is mounted to the first end of the first frame and the upper end of the other slide plate is connected to the second end of the first frame; each slide plate being movably mounted to the first frame for relative movement between each slide plate and the first frame in a direction toward and away from the front of the first frame.

17. The air filtering apparatus of claim 15, wherein the at least one cam surface is at least one inclined slot formed in the lower end of each slide plate; and the first and second ends of the second frame each have at least one pin, and each pin is disposed within one of the inclined slots of the slide plate.

18. The air filtering apparatus of claim 15, wherein the moving means further includes a means for actuating the moving means to provide relative movement between the second frame and the slide plates.

19. The air filtering apparatus of claim 18, wherein the actuating means is at least one handle connected to each of the first and second ends of the first frame, the at least one handle having an upper and a lower end, the upper end of the at least one handle being pivotally connected to at least one of the ends of the first frame, and the lower end of the at least one handle connected to one of the slide plates whereby upon rotation of the at least one handle, with respect to the first frame, relative movement is provided between the second frame and the cam surfaces of each slide plate to cause the second frame to move to, and from, the first position.

20. The air filtering apparatus of claim 18, wherein the actuating means is at least one threaded shaft which is received in at least one journal bearing associated with at least one slide plate, whereby upon rotation of the at least one threaded shaft within the at least one journal bearing, relative movement is provided between the second frame and the cam surfaces of each slide plate to cause the second frame to move to, and from, the first position.

21. The air filtering apparatus of claim 14, including an indicator means for indicating when the second frame is in the first position.

22. The air filtering apparatus of claim 21, wherein the indicator means is an elongate member secured to at least one slide plate, the elongate member extending outwardly toward the front of the first frame, and when the second frame is in the first position the elongate member contacts the filter access door and prevents the filter access door from being attached to the cabinet.

23. The air filtering apparatus of claim 15, wherein the second frame has an upwardly extending lip on a portion of the top of the second frame, which lip positions the filter upon the second frame.

24. The air filtering apparatus of claim 15, including a means for locking the second frame in the first position.

25. The air filtering apparatus of claim 24, wherein the locking means is at least one notched portion formed in at least one slide plate, and a handle pivotally mounted to the first frame member and connected to at least one slide plate, is releasably received within the at least one notched portion to releasably lock the second frame in the first position.

26. The air filtering apparatus of claim 15, wherein the bottom of the first frame has a gasket which is compressed by the filter abutting the gasket, when the second frame is in the second position.

27. A filter mounting device for use in an air filtering apparatus which includes a cabinet having at least one filter access door, a filter, and an air outlet for air exiting the filter, comprising:
a) a first frame having first and second ends and a front and a rear, and adapted to be fixedly secured within the cabinet adjacent the filter access door and beneath the air outlet;
b) a second frame having first and second ends and a front and a rear, disposed beneath the first frame in a spaced relationship with respect to the first frame to define a filter receiving cavity with the second frame adapted to support the filter;
c) a means for substantially simultaneously moving the first and second ends of the second frame upwardly, from a first position which permits a filter to be loosely disposed within the filter receiving cavity, toward the first frame into a second position with the filter disposed in a sealed relationship with respect to the air outlet, including at least one cam surface, associated with each of the first and second ends of the second frame; the cam surfaces permitting relative movement between the second frame and the cam surfaces and causes the second frame to move to, and from, the first position; and
(d) the moving means further includes a means for actuating the moving means to provide relative movement between the second frame and slide plates disposed at both ends of the first and second frames and the actuating means is at least one handle connected to each of the first and second ends of the first frame, the at least one handle having an upper and a lower end, the upper end of the at least one handle being pivotally connected to at least one of the ends of the first frame, and the lower end of the at least one handle connected to one of the slide plates whereby upon rotation of the at least one handle, with respect to the first frame, relative movement is provided between the second frame and the cam surfaces of each slide plate to cause the second frame to move to, and from, the first position.

28. The filter mounting device of claim 27, wherein each slide plate has an upper and a lower end; and the lower end of each slide plate has the at least one cam surface associated therewith.

29. The filter mounting device of claim 28, wherein the upper end of one slide plate is mounted to the first end of the first frame and the upper end of the other slide plate is connected to the second end of the first frame; each slide plate being movably mounted to the first frame for relative movement between each slide plate and the first frame in a direction toward and away from the front of the first frame.

30. The filter mounting device of claim 28, wherein the at least one cam surface is at least one inclined slot formed in the lower end of each slide plate; and the first and second ends of the second frame each have at least one pin, and each pin is disposed within one of the inclined slots of the slide plate.

31. The filter mounting device of claim 28, further including a means for biasing the second frame into the second position.

32. The filter mounting device of claim 31, wherein the biasing means is a spring, having first and second ends, disposed at each of the ends of the second frame, the first end of each spring being connected to an end of the second frame, and the second end of each spring being connected to a slide plate.

33. The filter mounting device of claim 27, wherein the actuating means is at least one threaded shaft which is received in at least one journal bearing associated with at least one slide plate, whereby upon rotation of the at least one threaded shaft within the at least one journal bearing, relative movement is provided between the second frame and the cam surfaces of each slide plate to cause the second frame to move to, and from, the first position.

34. The filter mounting device of claim 28, including an indicator means for indicating when the second frame is in the first position.

35. The filter mounting device of claim 34, wherein the indicator means is an elongate member secured to at least one slide plate, the elongate member extending outwardly toward the front of the first frame, and when the second frame is in the first position the elongate member is adapted to contract the filter access door and prevent the filter access door from being attached to the cabinet.

36. The filter mounting device of claim 28, wherein the second frame has an upwardly extending lip on a portion of the top of the second frame, which lip positions the filter upon the second frame.

37. The filter mounting device of claim 28, including a means for locking the second frame in the first position.

38. The filter mounting device of claim 37, wherein the locking means is at least one notched portion formed in at least one slide plate, and a handle pivotally mounted to the first frame member and connected to at least one slide plate, is releasably received within the at least one notched portion to releasably lock the second frame in the first position.

39. The filter mounting device of claim 28, wherein the bottom of the first frame has a gasket which is compressed by the filter abutting the gasket, when the second frame is in the second position.

40. An air filtering apparatus for providing filtered air to an enclosed space, comprising:
 a) a cabinet, including at least one filter access door;
 b) an unfiltered air inlet in the cabinet for unfiltered air;
 c) a filtered air outlet in the cabinet;
 d) at least one filter disposed in the cabinet, the at least one filter having an air inlet and an air outlet associated therewith in the cabinet;
 e) a blower disposed in the cabinet for drawing unfiltered air from the unfiltered air inlet, through the at least one filter and outwardly through the filtered air outlet; and
 f) a filter mounting device disposed in the cabinet, the filter mounting device including a first frame, having first and second ends and a front and a rear, fixedly secured within the cabinet adjacent the at least one filter access door and beneath the air outlet associated with the at least one filter; a second frame, having first and second ends and a front and a rear, disposed beneath the first frame in a spaced relationship with respect to the first frame to define a filter receiving cavity with the at least one filter being disposed upon, and supported by, the second frame; and a means for substantially simultaneously moving the first and second ends of the second frame upwardly, from a first position which permits the at least one filter to be loosely disposed within the filter receiving cavity, toward the first frame, into a second position with the at least one filter disposed in a sealed relationship with respect to the air outlet, including at least one cam surface, associated with each of the first and second ends of the second frame; the cam surfaces permitting relative movement between the second frame and the cam surfaces and causes the second frame to move to, and from, the first position; and the moving means further includes a means for activating the moving means to provide relative movement between the second frame and slide plates disposed at both ends of the first and second frames, the activating means being at least one handle connected to each of the first and second ends of the first frame, the at least one handle having an upper and a lower end, the upper end of the at least one handle being pivotally connected to at least one of the ends of the first frame, and the lower end of the at least one handle connected to one of the slide plates whereby upon rotation of the at least one handle, with respect to the first frame, relative movement is provided between the second frame and the cam surfaces of each slide plate to cause the second frame to move to, and from, the first position.

41. The air filtering apparatus of claim 40, wherein each slide plate has an upper and a lower end; and the lower end of each slide plate has the at least one cam surface associated therewith.

42. The air filtering apparatus of claim 41, wherein the upper end of one slide plate is mounted to the first end of the first frame and the upper end of the other slide plate is connected to the second end of the first frame; each slide plate being movably mounted to the first frame for relative movement between each slide plate and the first frame in a direction toward and away from the front of the first frame.

43. The air filtering apparatus of claim 41, wherein the at least one cam surface is at least one inclined slot formed in the lower end of each slide plate; and the first and second ends of the second frame each have at least one pin, and each pin is disposed within one of the inclined slots of the slide plate.

44. The air filtering apparatus of claim 41, further including a means for biasing the second frame into the second position.

45. The air filtering apparatus of claim 44, wherein the biasing means is a spring, having first and second ends, disposed at each of the ends of the second frame, the first end of each spring being connected to an end of the second frame, and the second end of each spring being connected to a slide plate.

46. The air filtering apparatus of claim 40, wherein the actuating means is at least one threaded shaft which is received in at least one journal bearing associated with at least one slide plate, whereby upon rotation of the at least one threaded shaft within the at least one journal bearing, relative movement is provided between the second frame and the cam surfaces of each slide plate to cause the second frame to move to, and from, the first position.

47. The air filtering apparatus of claim 40, including an indicator means for indicating when the second frame is in the first position.

48. The air filtering apparatus of claim 47, wherein the indicator means is an elongate member secured to at least one slide plate, the elongate member extending outwardly toward the front of the first frame, and when the second frame is in the first position the elongate member contacts the filter access door and prevents the filter access door from being attached to the cabinet.

49. The air filtering apparatus of claim 41, wherein the second frame has an upwardly extending lip on a portion of the top of the second frame, which lip positions the filter upon the second frame.

50. The air filtering apparatus of claim 41, including a means for locking the second frame in the first position.

51. The air filtering apparatus of claim 50, wherein the locking means is at least one notched portion formed in at least one slide plate, and a handle pivotally mounted to the first frame member and connected to at least one slide plate, is releasably received within the at least one notched portion to releasably lock the second frame in the first position.

52. The air filtering apparatus of claim 41, wherein the bottom of the first frame has a gasket which is compressed by the filter abutting the gasket, when the second frame is in the second position.

* * * * *

UNITED STATES PATENT AND TRADEMARK OFFICE
CERTIFICATE OF CORRECTION

PATENT NO.    : 5,447,544
DATED         : September 5, 1995
INVENTOR(S)   : Gaylon W. Birdwell It is certified that error appears in the above-identified patent and that said Letters Patent is hereby corrected as shown below:

In Column 12, line 53, after "least", insert --one--.

In Column 13, line 21, after "frame", insert --and--.

Signed and Sealed this

Seventh Day of November, 1995

Attest:

BRUCE LEHMAN

Attesting Officer        Commissioner of Patents and Trademarks